Aug. 9, 1927.
W. SCHLÜTER
LENS CUTTING MACHINE
Filed Sept. 20. 1926
1,638,063
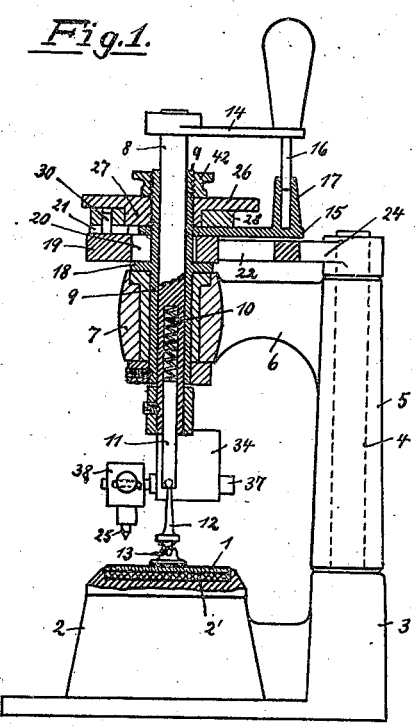
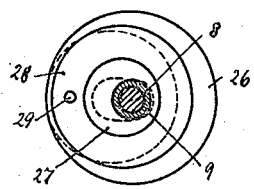
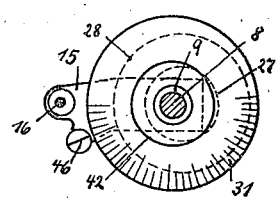
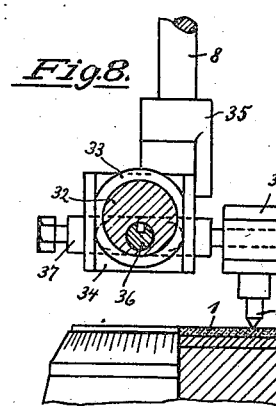
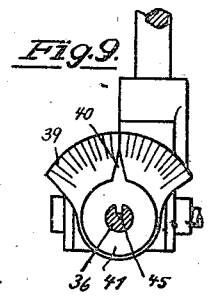
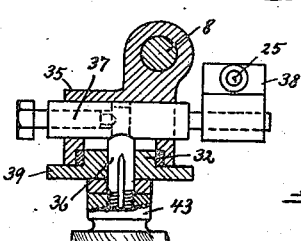
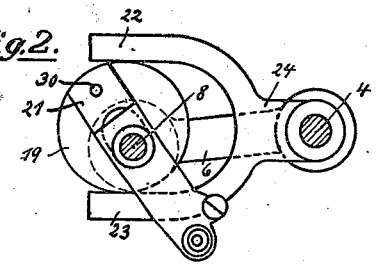
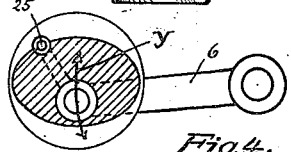
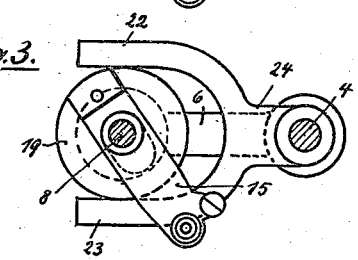
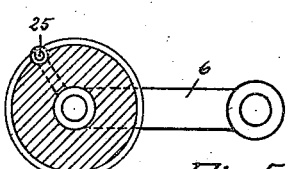
W. Schlüter
inventor
By: Marks & Clerk
Attys Patented Aug. 9, 1927.

1,638,063

UNITED STATES PATENT OFFICE.

WILLI SCHLÜTER, OF BRUNSWICK, GERMANY, ASSIGNOR TO THE FIRM GRIMME, NATALIS U. CO. AKTIENGESELLSCHAFT, OF KASTANIENALLE, 71, BRAUNSCHWEIG, GERMANY.

LENS-CUTTING MACHINE.

Application filed September 20, 1926, Serial No. 136,699, and in Germany May 14, 1924.

My invention relates to an improvement in a spectacle glass cutting machine for the cutting of round, oval or elliptical and so-called pantoscopic spectacle glasses.

The new machine according to my invention is characterized by a satisfactory supporting and guidance of the driving shaft for the cutting diamond.

A further advantage of my invention consists in the fact that the adjustment of the driving shaft into a concentric or an eccentric position is effected by simple and reliably acting means.

A further advantage of my invention is to be seen in the fact that the adjustment of the radius of the round glass and the adjustment of the semi major axis of the elliptical or oval glass is effected without employing a screw-thread.

The accompanying drawings show one constructional example of my invention:

Fig. 1 shows the new machine in partial sectional elevation;

Fig. 2 shows a plan of the driving members with the driving shaft in an eccentric position;

Fig. 3 shows the same parts as Fig. 2, but in a concentric position relative to one another;

Fig. 4 shows diagrammatically how an elliptical path is described by the cutting diamond when the driving members are adjusted in accordance with Fig. 2;

Fig. 5 shows diagrammatically how the cutting diamond describes a circular path with the adjustment of the parts in accordance with Fig. 3;

Fig. 6 shows the adjusting apparatus by means of which the driving shaft is brought into a concentric or an eccentric position, as seen from below;

Fig. 7 shows the same adjusting apparatus, as seen from above.

Fig. 8 shows the adjusting apparatus for the diameter of the glass to be cut, partly in section, from the front;

Fig. 9 shows the same apparatus in front elevation;

Fig. 10 is a plan of Fig. 8.

For the positioning of the spectacle glass 1 there serves a table 2, which is provided with an india rubber plate 2' or the like and which forms part of a machine frame 3. To one side of the table 2 is fixedly arranged, on the part 3, a column 4 upon which, by means of a long sleeve 5, a bracket or cantilever 6 is swingably supported.

On its free end this cantilever 6 carries a bearing 7 for the driving shaft 8 of the cutting diamond 25. This driving shaft 8 is axially displaceable in a sleeve 9 and is provided at its lower end with an axial bore in which is located a spring 10 which acts upon a pin 11. On the lower end of the pin 11 is arranged a support 12 which firmly holds the spectacle glass 1 and which is spherically supported at both ends in order that its foot 13, when placed upon the spectacle glass, may remain immovable when the shaft 11 moves radially. The shaft 8 is provided with a hand-crank 14, and the sleeve 9 is provided with a crank 15, which is driven by the crank 14 by means of a pin 16 which slides in a sleeve 17 on the crank 15 as the shaft 8 slides downwards. On a collar 18, with which the sleeve 9 bears upon the bearing 7, is located a circular disc 19 which is slidable, with an elongated hole 20, upon the sleeve 9, radially to the shaft 8. The disc 19 possesses a transverse groove or recess 21 by which it is slidably associated with the crank 15 and is driven by this crank as the driving shaft 8 rotates. The disc 19 rolls between two prongs 22 and 23 of a forked arm 24. This forked arm is fixedly arranged upon the upper part of the column 4 above the sleeve 5 of the cantilever 6. When the disc 19 is concentric with the shaft 8 according to Fig. 3, a glass cutter 25 supported at the lower end of the shaft 8 describes a circular path, as shown in Fig. 5, that is to say, a round glass is cut out. If the disc 19 is displaced radially between the collar 18 and the crank 15 of the sleeve 9, it is eccentrically placed in relation to the shaft 8 (Fig. 2), and the latter moves to and fro as it rotates in the direction of the arrow y in Fig. 4. This takes place because the disc 19 rolling between the fixed prongs 22 and 23 swings the cantilever 6 round the column 4. By this swinging movement the glass cutter 25, as shown in Fig. 4, moves upon a substantially elliptical curve, that is to say, a substantially elliptical glass is cut.

The apparatus by which the disc 19 is shifted into the concentric and eccentric position relative to the shaft 8 can be seen from Figs. 1, 6 and 7. A small hand-wheel 26 rotatable upon the sleeve 9 is provided with a hub 27 eccentrically arranged in relation to its bore. Over this hub is slipped a ring 28, which remains stationary during the rotation of the hand-plate 26, in which therefore the hub 27 rotates. In this ring is arranged a bore 29 (Fig. 6) in which a pin 30 engages. This pin 30 is secured to the disc 19. During the rotation of the disc 26 its hub 27 displaces the ring in such a way that its bore 29 moves the pin 30 and consequently the disc 19 radially in relation to the driving shaft 8. According to the direction of this movement, the disc 19 passes either into an eccentric position (Fig. 2) or into a concentric position (Fig. 3) relative to the shaft 8. The extent of this displacement can be read off on a scale 31, which is engraved on the hand-plate 26 and which moves past a mark 46, which is secured to the crank arm 15 of the sleeve 9, (Fig. 7). By means of a nut 42 adapted to be screwed upon the upper end of the sleeve 9, the parts can be clamped in the adjusted position.

For the adjustment of the diameter of the glass and of the major axis of ellipse there serves an eccentric disc 32, as shown in Figs. 8 to 10. This is surrounded by a ring 33 which with parallel surfaces guides the disc 32 in a bed 34. This bed 34 forms a part of the support 35 fixed to the lower end of the driving shaft 8, for the cutting diamond 25. The pivot of the disc 32 is formed by an axle 36 which forms, with a slide 37, a T-shaped piece (Fig. 10). To the slide 37 is secured the clamping device 38 for the cutting diamond 25. As the disc 32 rotates, this axle, and with it the slide 37, is shifted to right or left in consequence of the eccentricity of the said disc in relation to its axle 36. By this means the distance of the cutting diamond 25 from the axis of rotation of the shaft 8 is altered.

For the rotating of the disc 32 there serves a sector 39, to which the disc 32, as shown in Fig. 10, forms a hub. The sector 39 is provided with a graduated scale which travels past a pointer 40, which, with its disc 41, is slipped on to the axle 31. In order that this pointer 40 may not participate in the rotation of the sector 39, its disc 41 engages in a notch 45 in the axle 36. The dimension of the displacement of the cutting diamond 25 can be read off on this scale. By means of a nut 43 which screws on to the front end of the axle 36, the parts are clamped in the adjusted position.

What is claimed is:—

1. A spectacle glass cutting machine, comprising a stationary column, a cantilever swingably supported on said column, a glass cutter, a straight shaft carrying said glass cutter and rotatably and longitudinally slidably supported in said cantilever, means for imparting to said shaft and cantilever a positive swinging movement as the shaft is rotated including means for adjusting the amplitude of said movement, said means comprising a transversely adjustable eccentric carried by said shaft and rotatable therewith, and a member having spaced stationary surfaces tangential to and bearing at opposed parts against the periphery of said eccentric and between which the eccentric can rotate.

2. A spectacle glass cutting machine, comprising a stationary column, a cantilever swingably supported on said column, said cantilever consisting of two parallel sleeves rigidly connected with one another, one of said sleeves fitting over said column to enable said cantilever to swing around said column, a glass cutter, a shaft carrying the glass cutter and rotatably and slidably supported in the second sleeve of said cantilever, means for imparting to said shaft and cantilever a positive swinging movement as the shaft is rotated including means for adjusting the amplitude of said movement, said means comprising a transversely adjustable eccentric carried by said shaft and rotatable therewith, and a member having spaced stationary surfaces tangential to and bearing at opposed parts against the periphery of said eccentric and between which the eccentric can rotate, substantially as and for the purposes set forth.

3. A spectacle glass cutting machine, comprising a stationary column, a cantilever swingably supported on said column, a glass cutter, a driving shaft journalled vertically in said cantilever and arranged parallel to said column and carrying said glass cutter, an adjustable stroke device for the driving shaft including a part transversely adjustable on and with the shaft, and a forked arm fixedly connected with said column with the prongs arranged on opposite sides of and in contact with the part on the shaft, substantially as and for the purposes set forth.

4. A spectacle glass cutting machine, comprising a column, a cantilever swingable on said column and forming a bearing, a driving shaft mounted for rotatable and vertical sliding movement in the bearing on the cantilever and arranged parallel to the column, a disc radially displaceable in relation to said driving shaft, an arm carried with the driving shaft, the disc being adapted to slide on said arm, guides arranged on opposite sides of the disc for contact therewith and fixedly connected to said column, the disc being rotatable with the driving shaft between said guides, another disc rotatable on the shaft, and means interposed between the discs for shifting the radially displaceable disc upon rotation of the last-named substantially as and for the purposes set forth.

5. A spectacle glass cutting machine, comprising a column, a cantilever swingable on said column and forming a bearing, a driving shaft mounted for rotatable and slidable movement in the bearing and said cantilever arranged parallel to the column, an eccentric disc radially displaceable with respect to said driving shaft, an arm fixedly connected with the driving shaft, the disc being adapted to slide along said arm, spaced stationary guides for said disc, the disc being rotatable with the driving shaft and positioned between said guides, an adjustable disc rotatable on the shaft, a cam on said adjustable disc, a ring embracing said cam and provided with a cavity, and a pin on the eccentric disc engaging in the cavity in said ring, and means for clamping the discs together.

6. A spectacle glass cutting machine as claimed in claim 5, wherein a sleeve is provided to enclose said driving shaft and is formed with an annular collar on which the eccentric disc rests, and wherein the clamping means is mounted on the sleeve for coacting with the collar for clamping the adjusting and eccentric discs together in the desired relative positions, substantially as and for the purposes set forth.

In testimony whereof I have signed my name to this specification.

WILLI SCHLÜTER.